Sept. 14, 1965  J. W. TUMAVICUS  3,205,657
ROCKET THRUST VECTORING DEVICE
Filed April 13, 1960  2 Sheets-Sheet 1

INVENTOR
JULIUS W. TUMAVICUS
BY  ATTORNEY

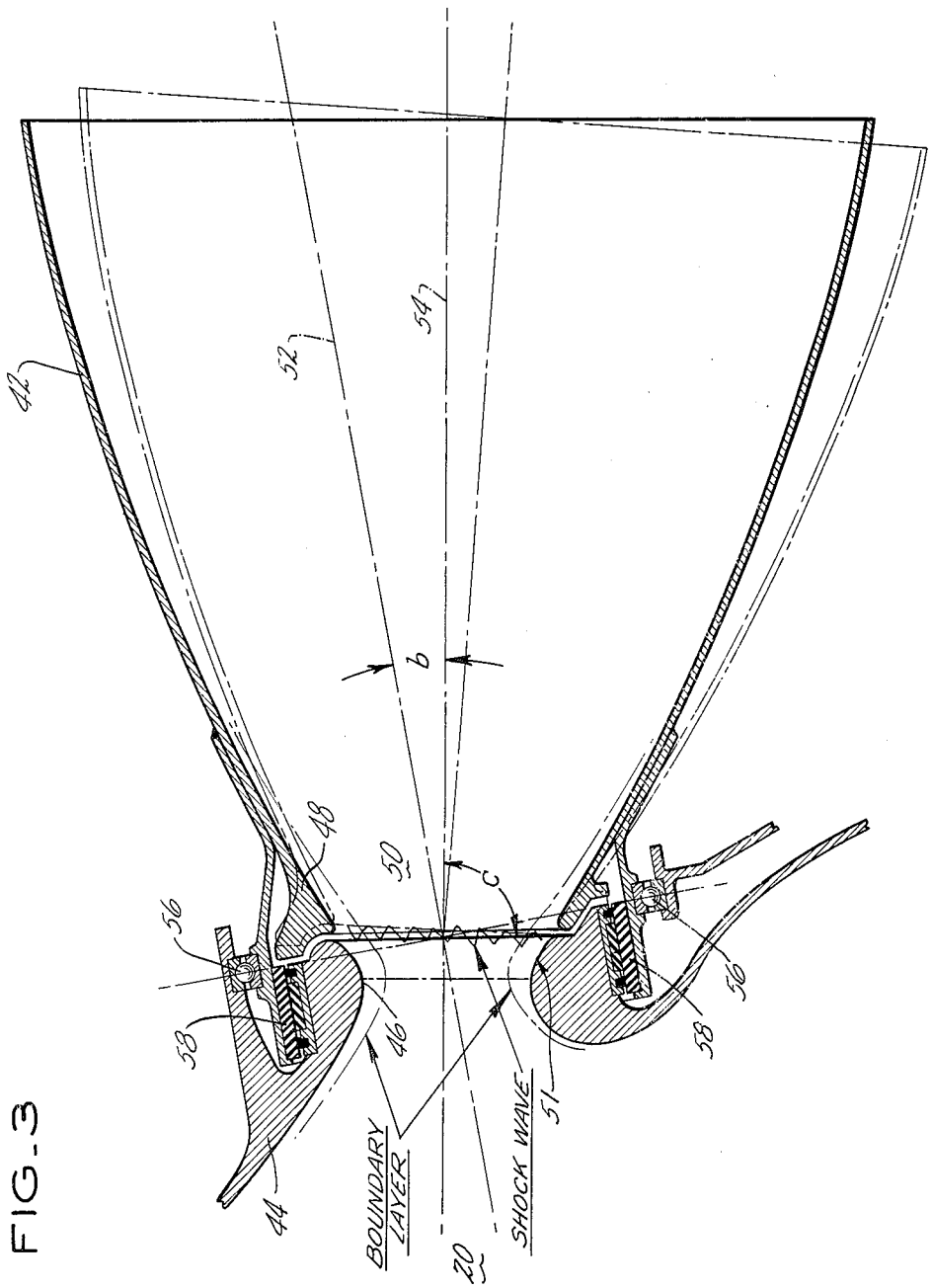

United States Patent Office 3,205,657
Patented Sept. 14, 1965

3,205,657
ROCKET THRUST VECTORING DEVICE
Julius W. Tumavicus, Old Saybrook, Conn., assignor to United Aircraft Corporation, East Hartford, Conn., a corporation of Delaware
Filed Apr. 13, 1960, Ser. No. 21,958
3 Claims. (Cl. 60—35.55)

This invention relates to exhaust nozzles for rockets. More particularly it relates to rocket exhaust nozzles which can be rotated to control rocket thrust.

In most rocket configurations one or more exhaust nozzles are rigidly connected to the combustion chamber. In such a case, thrust control in liquid propellant rockets is generally achieved by varying the flow of propellants, and thrust control in a solid propellant rocket is generally achieved by a pre-set variation in the chemical composition of the propellants. Thrust reversal is not possible with such arrangements.

One configuration for obtaining thrust control, and pitch, yaw and roll control is found in my copending application Serial No. 822,885, filed in June 25, 1959 and now Patent No. 3,057,581. In that invention the nozzles are mounted on gimbals or pivots, and thrust and vector control are obtained by pivotal movement of the nozzles. A feature of the present invention is the accomplishment of thrust control and vectoring by rotation of the exhaust nozzles. Another feature of this invention is a nozzle construction by which thrust control and vector control as well as reverse thrust can be accomplished by rotation of the nozzle.

Another problem present in rocket exhaust nozzles is that of erosion of the inner wall of the exhaust nozzle, particularly at the throat of the convergent-divergent nozzle. The high temperature of the exhaust gases causes plasticity of the nozzle wall, and erosion results from scrubbing and friction between the gas stream and the wall and from impurities in the high velocity gas stream. Accordingly, a feature of this invention is a nozzle in which erosion is substantially reduced.

Other features and advantages will be apparent from the specification and claims, and from the accompanying drawings which illustrate an embodiment of the invention.

FIG. 3 is a view similar to FIG. 2 showing a modified form of the nozzle.

Figure 2:
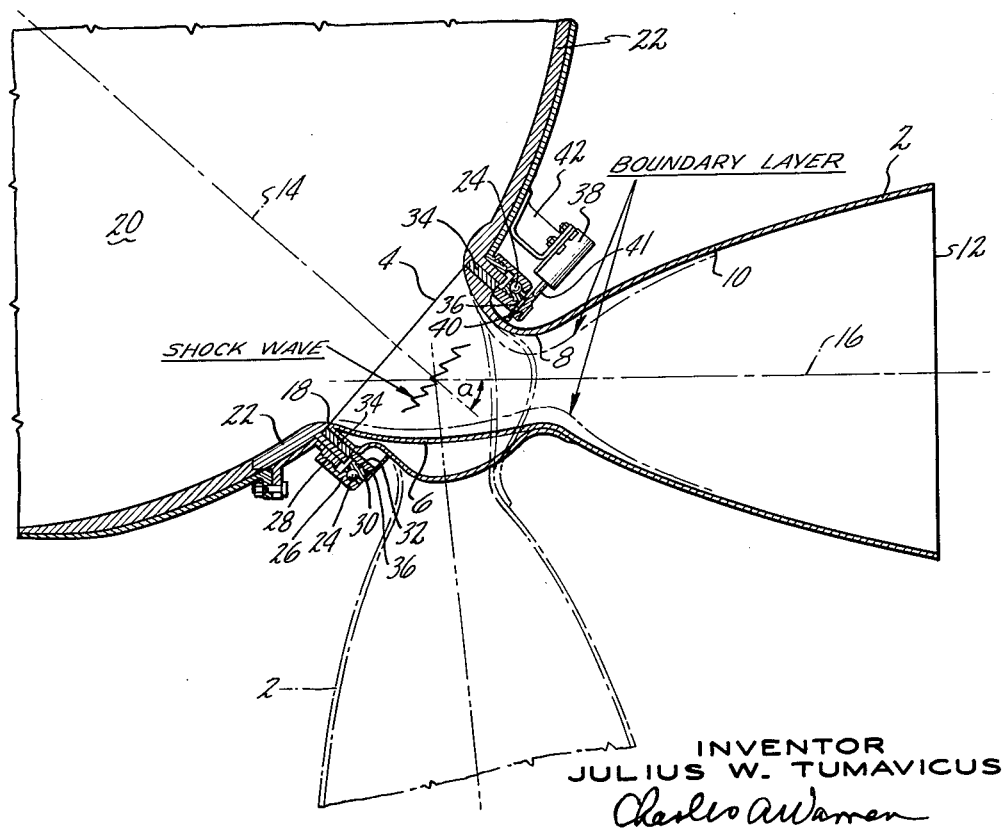
FIG. 2 is a sectional view through one of the exhaust nozzles.

Referring to FIG. 2 the nozzle 2 has an inlet 4, a convergent portion 6, and throat 8, and divergent portion 10, and an exit 12. The nozzle is bent upstream of the throat, the bend preferably being at a distance from the throat equal to 5–10% of the overall length of the nozzle. The portion of the nozzle upstream of the bend has an axis 14, and the portion of the nozzle downstream of the bend has an axis 16 which is the main longitudinal axis of the nozzle. These axes intersect in an acute angle $a$ upstream of the throat, the intersection being in the plane of the bend. Inlet 4 is of circular cross section and fits in a circular opening 18 in the casing 22 of the combustion chamber 20. The end of the combustion chamber casing 22 is of spherical shape at the intersection between the nozzle and the combustion chamber.

Nozzle 2 is mounted in a turret having a ball bearing 24 supporting the nozzle. The outer race 26 of the bearing is joined to casing 22 by a threaded connection 28, and the inner race 30 of the bearing is joined to the nozzle by a threaded connection 32. A cylindrical seal 34 surrounds the nozzle at the point of connection between the nozzle and the combustion chamber to prevent leakage of combustion gases. A gear 36 is mounted on the inner race 30 of ball bearing 24. Gear 36 is driven by a motor 38 through a gear 40 mounted on a shaft 41 to rotate nozzle 2. Motor 38 is mounted on struts 42 which are attached to casing 22. The axis 14 of the portion of the nozzle upstream of the bend is the axis of rotation of the nozzle and the bearing 24 obviously has this same axis.

Gases from combustion chamber 20 enter the nozzle along axis 14, are turned at the bend upstream of the throat 8 and pass through the remainder of the nozzle along main longitudinal axis 16. As shown in FIG. 2, the turning of the gases creates a shock wave and causes either separation of the gas stream or a thickening of the boundary layer downstream of the shock. This results in a substantial reduction in nozzle erosion and a substantial increase in efficient nozzle operation.

Figure 1:
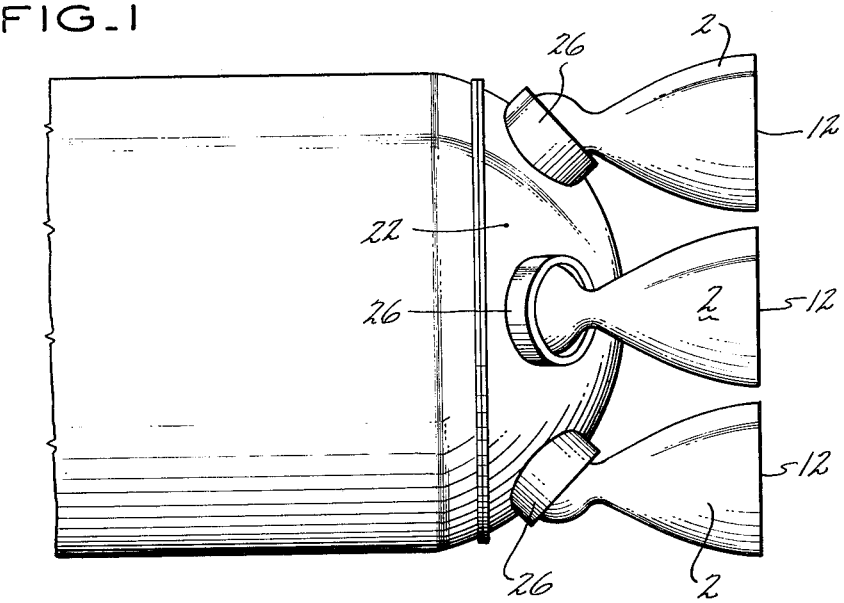
FIG. 1 shows a rocket with four exhaust nozzles spaced 90° apart.

Referring to FIG. 1, four of the nozzles 2 are attached to casing 22 and communicate with combustion chamber 20. The nozzles are spaced 90° apart. During regular operation of the rocket the main longitudinal axis 16 of each nozzle is parallel to the rocket axis. Vector control and some thrust control is accomplished by selective rotation of the nozzles through small angles. Greater degrees of thrust control can be attained by rotation of the nozzles through larger angles. By a selection of the angle $a$ more than 45°, it is possible to cause the nozzle to move into a position to produce reverse thrust since it will then, when rotated through 180° from the full line position of FIG. 2, have a forward component of thrust.

FIG. 3 shows a modified exhaust nozzle 42. The convergent portion 44 and the throat 46 are fixedly connected to and communicate with combustion chamber 20. A part 48 of divergent section 50 is rotatable about an axis 52 which intersects the main longitudinal axis 54 of the nozzle in an acute angle $b$ slightly downstream of the throat. The rotatable part 48 of divergent section 50 is separate from the remainder of the nozzle and is mounted in a turret having a bearing 56 for rotatably connecting it to the remainder of the nozzle. In the nonrotated position of the nozzle, the line of separation between the fixed part 51 and the rotatable part 48 of divergent section 50 intersects main longitudinal axis 54 in an angle $c$, preferably a right angle. A cylindrical seal 58 is incorporated between bearing 56 and the point of separation between the fixed and rotatable portions of the nozzle to protect the bearing and prevent leakage of combustion gases.

The point of intersection between axes 52 and 54 is preferably located at a distance downstream of the throat equal to 5–10% of the length of the nozzle.

When the nozzle is in a rotated position the gases, when passing through the nozzle, are turned at the intersection of the axes 52 and 54 thereby creating a shock wave. As shown in FIG. 3, the effects of the shock wave are reflected by a thickening of the boundary layer a slight distance upstream of the throat. Thus, by positioning the intersection of axes 52 and 54 only a slight distance downstream of the throat, erosion of the throat can be reduced.

The modified exhaust nozzle 42 is particularly adapted for use when only slight amounts of vectoring are necessary.

It is to be understood that the invention is not limited to the specific embodiment herein illustrated and described but may be used in other ways without departure from its spirit as defined by the following claims.

I claim:
1. A nozzle including a convergent inlet portion, a throat and a divergent discharge portion for the passage of gas, said nozzle having a main longitudinal axis, at least a part of said nozzle being rotatable about a second axis forming an acute angle with said main longitudinal axis and a bend in said nozzle a short distance from the throat whereby a shock wave is formed in the gas and erosion of the throat is reduced and wherein the distance between the bend and the throat is from five to ten percent of the overall length of the nozzle.

2. A nozzle including a convergent inlet portion, a throat and a divergent discharge portion for the passage of gas, said nozzle having a main longitudinal axis, at least part of said nozzle being rotatable about a second axis intersecting said main longitudinal axis in an acute angle at a point spaced from the throat, and a bend in said nozzle a short distance from the throat whereby a shock wave is formed in the gas and erosion of the throat is reduced and wherein the distance between the bend and the throat is from five to ten percent of the overall length of the nozzle.

3. A nozzle including a convergent inlet portion, a throat and a divergent discharge portion for the passage of gas, said nozzle having a bend a short distance upstream of the throat whereby a shock wave is formed in the gas and erosion of the throat is reduced and wherein the distance between the bend and the throat is from five to ten percent of the overall length of the nozzle.

References Cited by the Examiner

UNITED STATES PATENTS

| | | | |
|---|---|---|---|
| 2,857,740 | 10/58 | Hall et al. | |
| 2,986,877 | 6/61 | Emmons et al. | 60—35.55 |
| 3,025,667 | 3/62 | Moorehead | 60—35.54 |
| 3,048,977 | 8/62 | Geary | 60—35.55 |
| 3,146,589 | 9/64 | Twyford | 60—35.55 |

FOREIGN PATENTS 968,948   5/50   France.

SAMUEL LEVINE, *Primary Examiner.*

ABE BLUM, *Examiner.*